United States Patent [19]

Kobayashi

[11] Patent Number: 4,711,257

[45] Date of Patent: Dec. 8, 1987

[54] VEHICLE WASHING APPARATUS

[75] Inventor: Minoru Kobayashi, Tokyo, Japan

[73] Assignee: Nisshin Seiki Kabushiki Kaisha, Tokyo, Japan

[21] Appl. No.: 873,775

[22] Filed: Jun. 11, 1986

[51] Int. Cl.⁴ .............................. B08B 3/00; B24B 5/00
[52] U.S. Cl. ................................ 134/56 R; 134/45; 134/123; 52/67; 15/DIG. 2
[58] Field of Search ................. 134/45, 123, 172, 102, 134/56 R; 15/DIG. 2, 53 R, 53 A, 53 AB; 118/326, DIG. 7, 634; 98/115.2; 52/67, 64, 29

[56] References Cited

U.S. PATENT DOCUMENTS

| | | | |
|---|---|---|---|
| 1,456,478 | 5/1923 | White | 52/67 |
| 3,038,481 | 6/1962 | Brechtel | 134/123 X |
| 3,288,109 | 11/1966 | Smith, Jr. et al. | 134/123 X |
| 3,353,546 | 11/1967 | Mahoney | 134/123 |
| 3,438,077 | 4/1969 | Eubanks | 15/DIG. 2 X |
| 3,533,422 | 10/1970 | Alimanestiano | 134/45 |
| 3,724,472 | 4/1973 | Jenkins et al. | 134/123 X |
| 4,288,949 | 9/1981 | Latimer | 52/67 |

Primary Examiner—Louis K. Rimrodt
Assistant Examiner—J. L. Olds
Attorney, Agent, or Firm—Wenderoth, Lind & Ponack

[57] ABSTRACT

An apparatus for washing an automotive vehicle has box-shaped outer and inner hoods which are movable along rails laid on the ground to completely cover the vehicle to be washed and washing liquid spraying devices movably attached to the inner walls of the outer and inner hoods at positions appropriate for spraying liquid on the entire surface of the vehicle. The spray device sprays water, washing liquid and the like in accordance with the spraying steps. The washed vehicle is dried by blowing air through an air blowing device.

2 Claims, 12 Drawing Figures

VEHICLE WASHING APPARATUS

BACKGROUND OF THE INVENTION

This invention relates to an apparatus for washing an automotive vehicle such as car by spraying washing liquid or agents on the vehicle without using rotatable washing brushes.

A vehicle washing apparatus of a conventional type is generally provided with a portal or an inverted U-shaped frame assembly which advances over a car to be washed and comprises a horizontal upper frame and side frames vertically extending from both ends of the upper frame. An upper washing brush is attached to the lower portion of the upper frame and is rotatable and movable vertically. Side brushes are attached to the inner surfaces of the side frames, respectively, and are rotatable and movable horizontally along the car body. A water spray device is also provided on the frame assembly at a portion suitable for spraying a washing liquid on the car body surface.

According to this construction, when automatic washing of a car is required, all of the brushes are rotated and moved and the spray device sprays the washing liquid while moving the frame assembly along the length of the car body.

With the conventional vehicle washing apparatus of the type described above, the washing brushes are indispensable elements and other devices for driving the brushes, inclusive of moving, rotating, and elevating the same, are also required. In addition, the location and operation of the brushes in the frame assembly require much space therein and in turn frame assembly itself. Thus, the complicated and not economical. Moreover, the centrifugal movement of the washing brushes may scatter the washing liquid widely and wet other structures or equipment located nearby. The car washing in which the brushes are used may also damage, i.e. scrape, the coated surface of the car body, and sometimes, may generate a large noise.

SUMMARY OF THE INVENTION

It is an object of this invention to eliminate the above-mentioned defects of conventional apparatuses and to provide a vehicle washing apparatus for washing a vehicle by accommodating the same in a closed chamber defined by box-shaped inner and outer hoods and by spraying the vehicle using specific spray means without using any rotatable washing brushes of the conventional type.

According to the present invention, this and other objects are achieved by providing a vehicle washing apparatus comprising an outer hood provided with an opened front end and closed rear end, an inner hood located inside the outer hood that is movable along a pair of parallel rails mounted on the ground and between which a vehicle to be washed is parked, the inner hood being provided with an opened rear end and opened front end and with a shutter at the front end for closing the same to thereby define a washing chamber in association with the outer and inner hoods for accommodating the vehicle to be washed, a washing liquid spraying mechanism equipped inside the outer and inner hoods at a position appropriate for washing the vehicle, and an air blowing unit equipped inside the inner hood for blowing off water drops from the washed vehicle.

DESCRIPTION OF THE PREFERRED EMBODIMENTS

Figure 4:
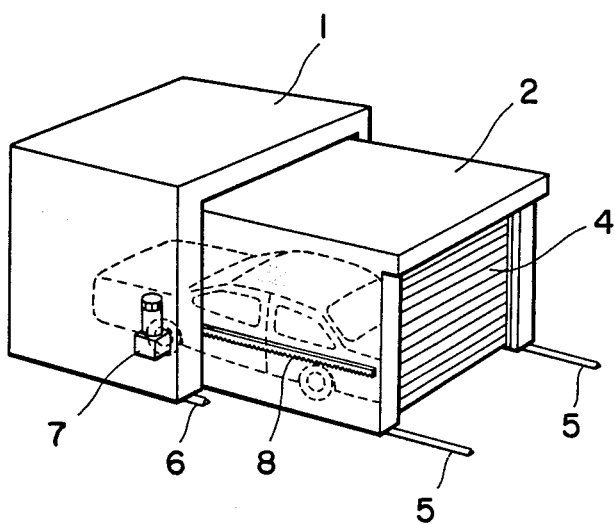
FIG. 4 is a perspective view of the apparatus at the third stage of the washing operation.
Figure 5:
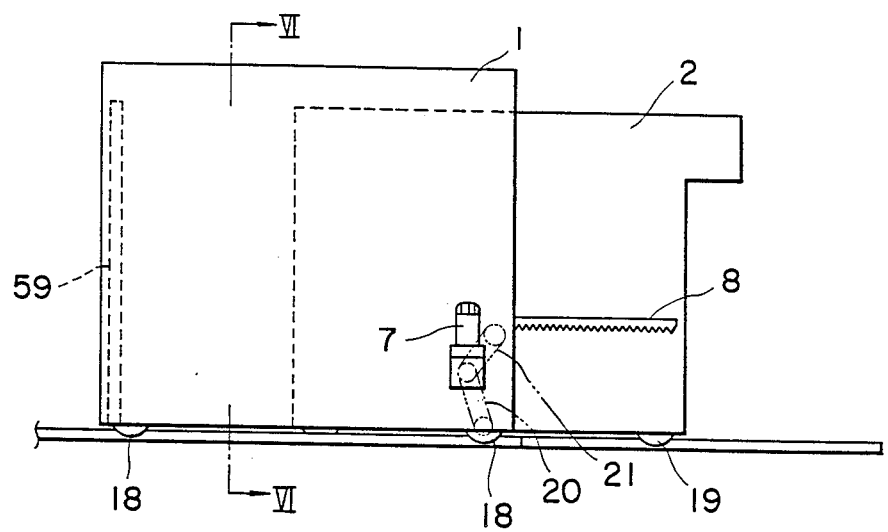
FIG. 5 is a side view of the apparatus.

Referring to the accompanying drawings, the vehicle washing apparatus of the present invention comprises a box-shaped outer hood 1 and a box-shaped inner hood 2 which is located inside the outer hood 1 and the outer hood 1 is provided with a front end opening and the inner hood 2 is also provided with front and rear end openings. The outer and inner hoods 1 and 2 rest on parallel rail members 6 and 5 disposed on the ground, respectively, and along which the outer and inner hoods 1 and 2 are moved by wheels or rollers 18 and 19, as shown in FIG. 5. The rails 5 are longer than the rails 6. The inner hood 2 is provided with a shutter 4 at the front end opening thereof as best illustrated in FIG. 4 the closed condition.

Figure 1:
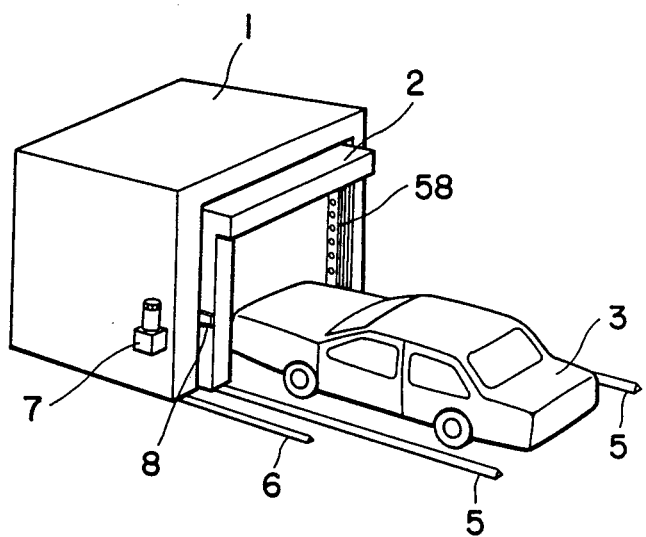
FIG. 1 is a perspective view of a vehicle washing apparatus according to the present invention, just before the washing operation.
Figure 2:
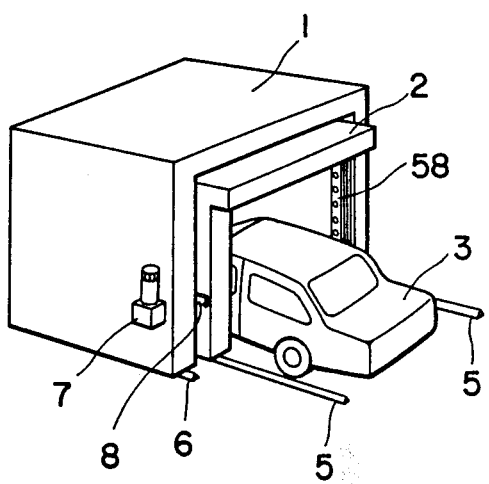
FIG. 2 is a perspective view of the apparatus at the first stage of the washing operation.
Figure 3:
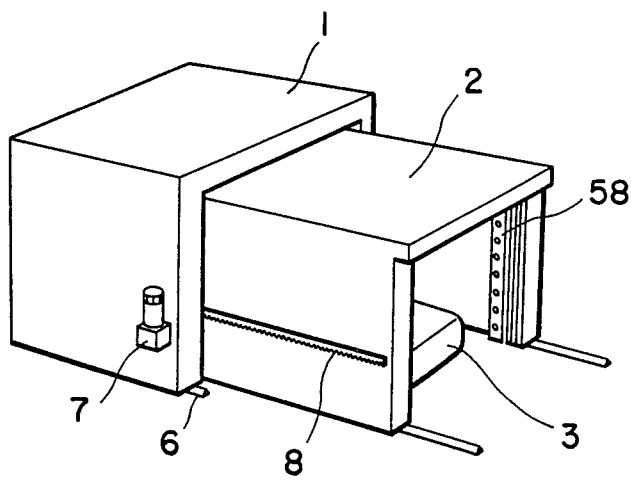
FIG. 3 is a perspective view of the apparatus at the second stage of the washing operation.

According to the basic construction described hereinbefore, and referring to FIG. 1, a car 3 to be washed is parked in front of the outer and inner hoods 1 and 2 which are positioned at this time in the backward limit positions thereof on the rails 6 and 5. FIG. 2 shows a condition in which the outer and inner hoods 1 and 2 have been moved forwardly so that the front portion of the car 3 is covered by the hoods. Next, only the inner hood 2 is moved forwardly so as to cover the whole body of the car 3 as shown in FIG. 3. Under these conditions, the shutter 4 is pulled downwardly to close the opening of the inner hood 2 and to accommodate the car 3 in the hoods as shown in FIG. 4, the shutter 4 being usually wound up at the upper portion of the opening of the inner hood 2.

The movements of the outer and inner hoods 1 and 2 described hereinabove are controlled by electric motors 7 mounted on the outside surfaces of the outer hood 1 and sensors described in detail hereinafter with reference to FIG. 9.

Figure 6:
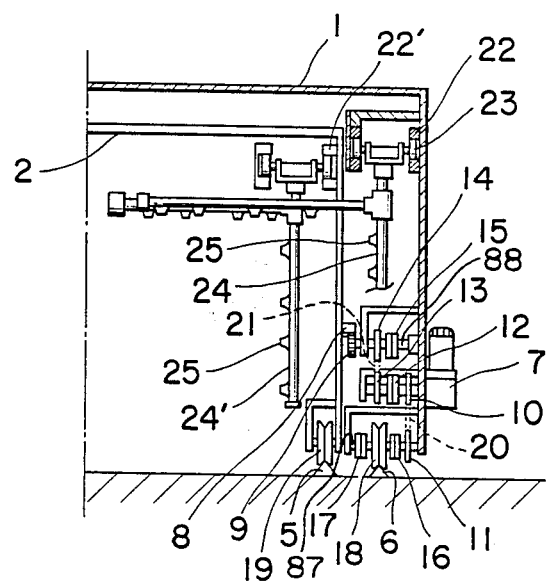
FIG. 6 is a sectional view taken in part along line VI—VI in FIG. 5.
Figure 7:
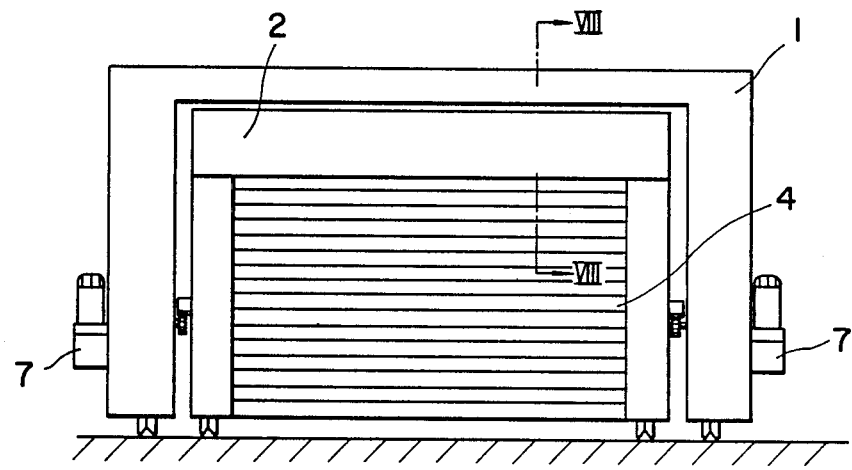
FIG. 7 is a front view of the apparatus shown in FIG. 4.

With reference to FIGS. 5 and 6, each of the motors 7 is provided with an output shaft which extends in the hood 1 through the outer wall of the hood 1, and on the output shaft of the motor 7, a sprocket 10 and a sprocket 13 are mounted through a clutch 12 to transmit the rotation of the output shaft to the sprockets. The sprockets 13 and 10 are operatively engaged with sprockets 14 and 11 respectively through chains 21 and 20 to transmit rotations. The rotation of the sprocket 11 is transmitted through a clutch 16 to a shaft of the roller 18 which in turn is connected to a stationary shaft 87 through the clutch 17, while a shaft of the sprocket 14 rotates a pinion 9 which in turn meshes with a rack 8 attached to the outer wall of the inner hood 2. The shaft of the sprocket 14 is connected to a stationary shaft 88 through a clutch 15. The rollers 19 attached to the lower portion of the inner hood 2 are constructed as idle wheels travelling on the rails 5.

It will of course be understood that the construction described hereinabove in conjunction with FIG. 6 as referred to on the one side, for example, right side, of the outer and inner hoods 1 and 2 and the construction of the other side, i.e. left side, are substantially the same.

The inner and outer hoods 2 and 1 operate follows.

When the clutches 15, 16 are in an operative condition, the clutches 12, 17 are otherwise in an inoperative condition and as each motor 7 rotates, the rollers 18 are driven so as to move the outer hood 1 forwardly on the rails 6 together and the inner hood 2 with the pinion 9 which is not now rotated because of the braking operation of the clutch 15. The forward limit of the movement of the outer hood is detected by a magnetic sensor 50 attached to the outer hood 1 and a ferromagnetic member 51 set on the ground. At this time, the clutches 12 and 17 become operative and the clutches 15 and 16 otherwise become inoperative, and under these conditions, when the motor 7 is driven, the rollers 18 are braked by the clutch 17 and the pinion 9 is rotated, so that the outer hood 1 does not move, while only the inner hood 2 is moved forwardly on the rails 5 due to the engagement of the pinion 9 and the rack 8.

Figure 9:
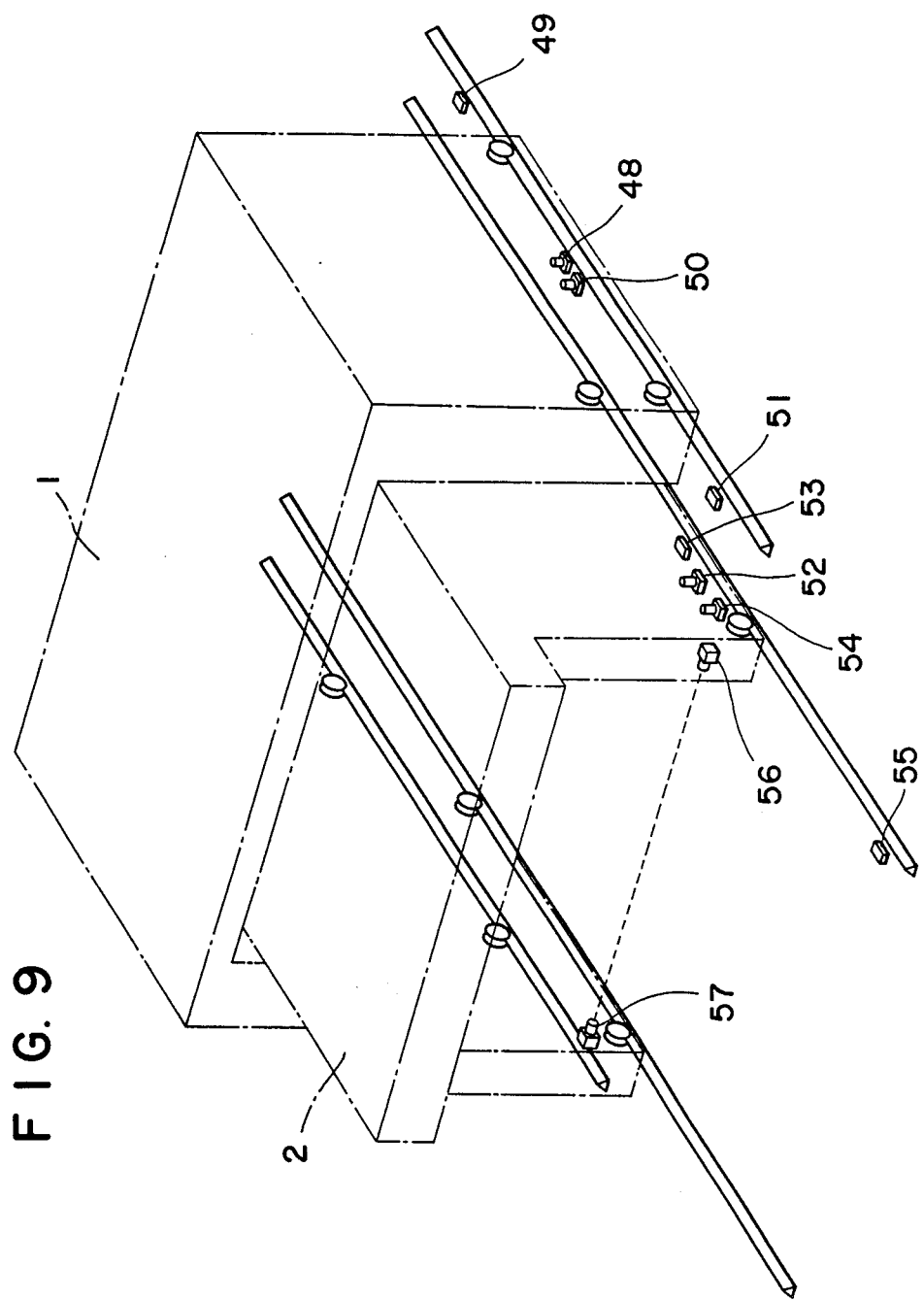
FIG. 9 is a perspective view showing an arrangement of sensing devices for controlling the operation of the apparatus.

As shown in FIG. 9, an infrared ray radiator 56 is attached to the inner surface of one side wall of the inner hood 2 near the front end thereof and an infrared ray sensor 57 is also attached to the inner surface of the other side wall thereof to receive the infrared ray from the radiator 56. The inner hood 2 moves forwardly on the rails 5 while covering a car parked at a predetermined position between the rails 5, and after a predetermined time when the infrared ray from the radiator 56 reaches the sensor 57 without being hindered by the car, the motor 7 stops the operation, thus ensuring a necessary space for washing the car in accordance with the care size. In case the infrared ray from the radiator 56 does not reach the sensor 57 in due time, a magnetic sensor 54 secured to the inner hood 2 stops the operation of the motor 7 in operative association with a ferromagnetic member 55 located on the ground to thereby avoid abnormal operation.

When the washing process is finished, the motor 7 is reversed, movements of the hoods occur in a reversed sequence from the above-mentioned one, and only end points of the movements of the inner hood and the outer hood are detected by a magnetic sensor 52 and a ferromagnetic member 53, and a magnetic sensor 48 and a ferromagnetic member 49, respectively.

Figure 8:
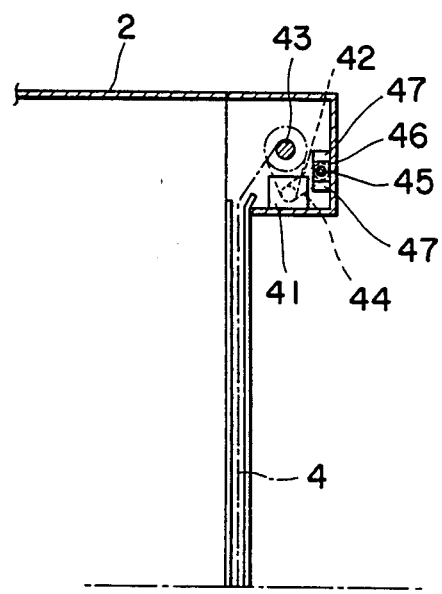
FIG. 8 is a sectional view in part taken along line VIII—VIII in FIG. 7.

When closing the shutter 4, a motor 41, (FIG. 8), rotates and drives a spool 43 and a screw 45 through chains 42, 44, so that the flexible shutter 4 is unwound and is lowered under the force of gravity, and at the same time, an actuator 46 which is engaged with the screw 45 and guided by guides 47 moves and pushes a limit switch (not shown in the drawing) at the end position of the closed shutter, thereby causing the motor 7 to stop. During the opening of the shutter, the motor 7 is reversed and anothr limit switch is used to detect the end position of the open shutter.

Figure 11:
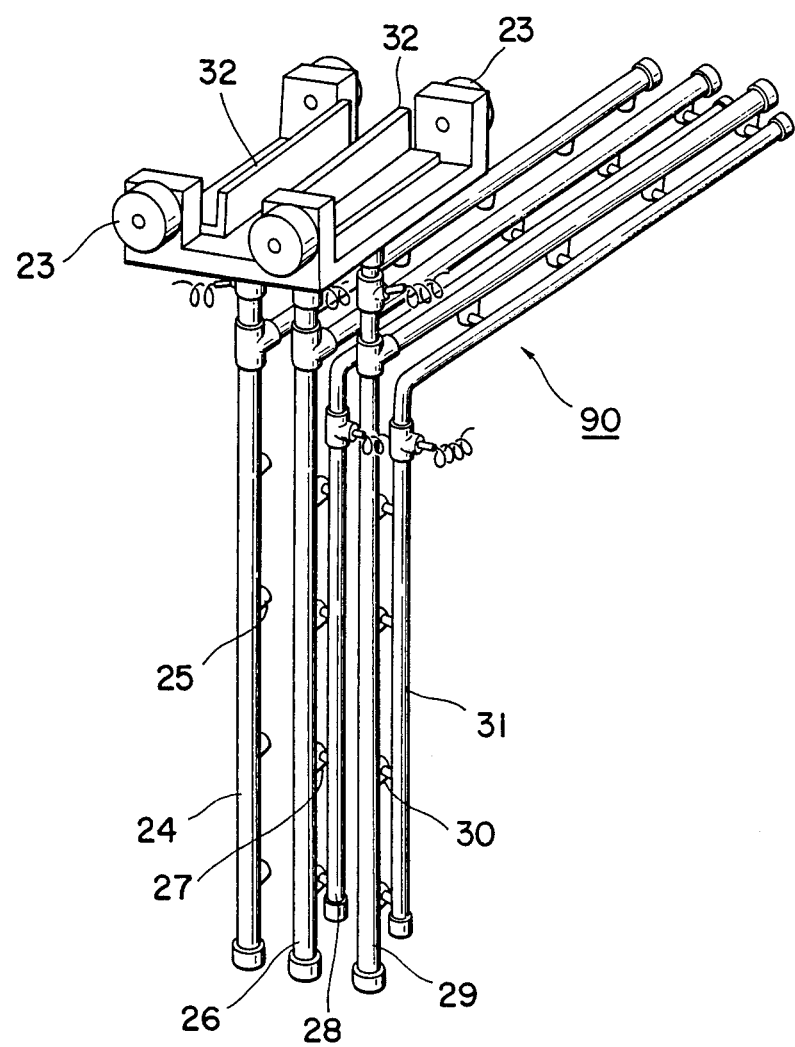
FIG. 11 is a perspective view of the spraying unit.

FIG. 11 is a perspective view of a washing liquid spraying device 90, and according to this invention, two pairs of the spraying devices of this type are detachably on the outer and inner hoods 1 and 2 by the manner described hereinafter in conjunction with FIG. 6. The spraying device 90 comprises a plurality of pipes 24, 26, 28, 29 and 31 and a support on which the pipes are supported. These pipes are connected with each other by any suitable means or with the support and each pipe consists of vertical and horizontal parts, respectively. The pipe 24 is provided with a plurality of nozzles 25 through which washing liquid is sprayed in a fan shape, and the liquid flow pipe 26 and the air flow pipe 28 are connected with each other through a plurality of nozzles 27 through which foam is emitted. The liquid flow pipe 29 and the air pipe 31 are also connected with each other through a plurality of nozzles 30 through which mist is emitted. The support comprises a base to which the pipes 24, 26 and 29 are connected, two pairs of rollers 23 rotatably attached to both sides of the base and angles 32 mounted on the base between the respective paired rollers 23.

Figure 10:
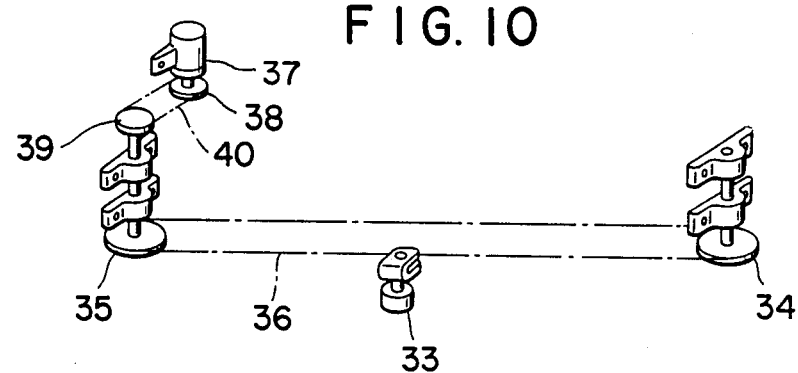
FIG. 10 is a perspective view of a driving device for a spraying unit of the apparatus.

As shown in FIG. 6, rails 22 and 22' are mounted on the upper inner surface of the outer and inner hoods 1 and 2 so that the respective pairs of rollers 23 are engaged therewith to travel in a direction parallel to the movement of the outer or inner hood. The horizontal parts of the pipes mentioned hereinbefore are positioned above the car body to be washed and the vertical parts of the pipes are positioned on the side thereof. The horizontal movement of the spraying unit 90 is performed by a mechanism shown in FIG. 10, in which an electric motor 37 has a rotatable shaft connected to a sprocket 38 which in turn is operatively connected to a sprocket 35 through a chain 40 and a sprocket 39. A chain 36 is engaged around the sprocket 35 and a sprocket 34, and to the chain 36 is secured a roller 33 which is inserted between the angles 32. Accordingly, the spraying unit 90 is moved horizontally by the operation of the motor 37 and the movement of the spraying unit 90 is controlled by a limit switch, not shown. According to this invention, two pairs of the spraying units 90, each having the construction described hereinabove, are attached to the upper portions of the outer and inner hoods 1 and 2 at the front and rear portions thereof as best illustrated in FIG. 6. The horizontal and the longitudinal movements of these spraying units 90 are totally controlled by the size of the car body to be washed.

In a preferred embodiment of the spraying device of this invention, a plurality of pipes 5, each being of a type similar to the pipe 24, are attached to the rear wall of the outer hood 1 and are provided with a plurality of nozzles through which washing liquid is sprayed on the front portion of the car body.

As briefly shown in FIG. 1 or 2, an inverted U-shaped pipe 58 is disposed on both sides and to the upper side of the front portion of the inner hood 2, and through the pipe 58 is blown air from a blower, not shown, to the surface of the car body.

Figure 12:
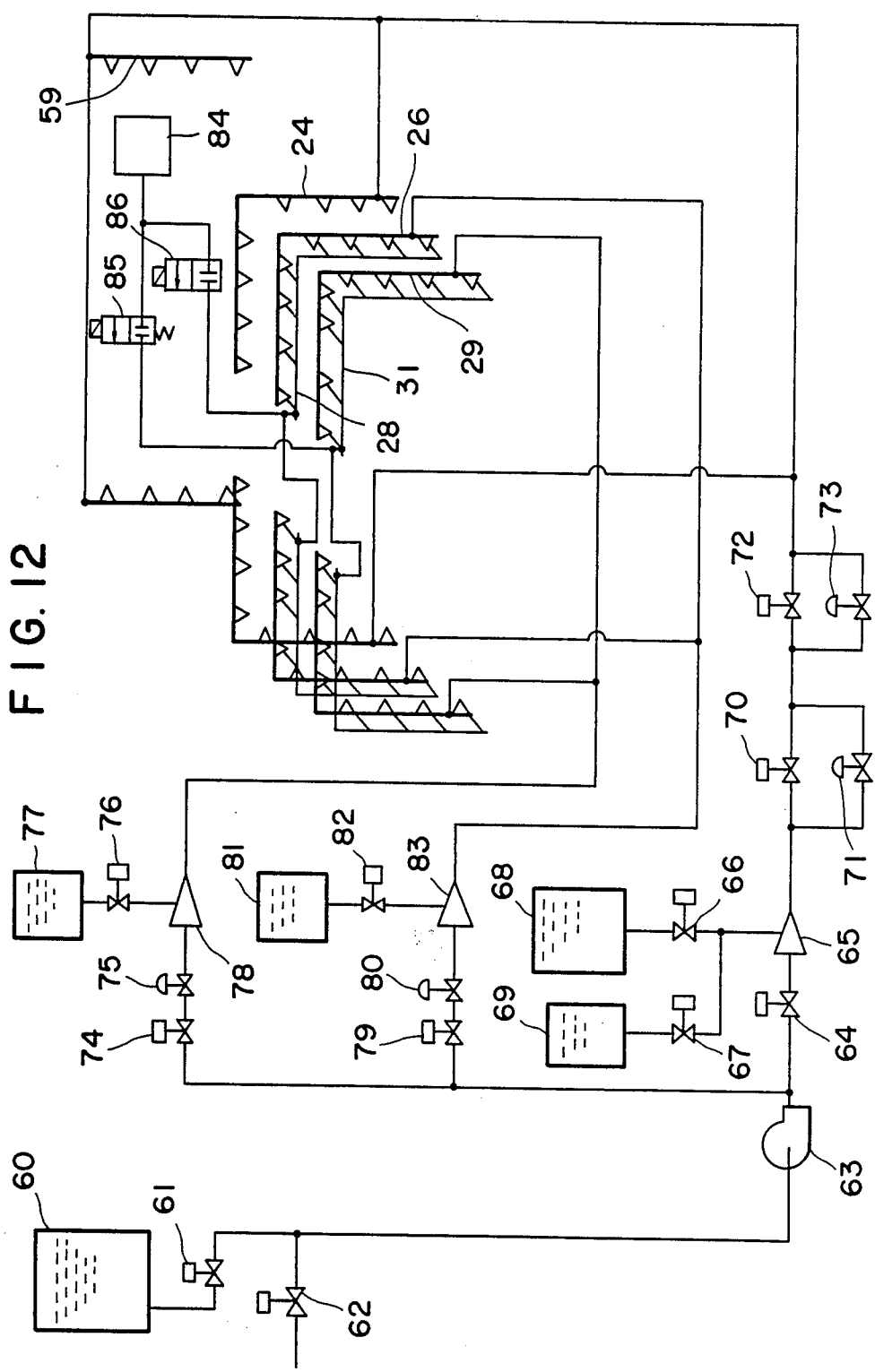
FIG. 12 is a diagram showing a pipe arrangement for the spraying unit.

The vehicle washing apparatus according to this invention operates as follows with reference to FIG. 12.

During a first stage, purified or recycled water in a tank 60 is supplied to the pipes 24 and 59 through a solenoid valve 61, a pump 63, a solenoid valve 64, a mixer 65, a solenoid valve 70 and a solenoid valve 72, while the spraying units 90 travel between two end points. Thus water is sprayed against the surface of the car under the pressure of 10 to 15 kg/cm$^2$. All solenoid valves except the ones are closed, but when the level of the water in the tank 60 is low, a solenoid valve 62 is opened.

During a second stage, the mixture of the water in the tank 60 and the slurry in a tank 69 is supplied to the pipes 24 and 59 through the solenoid valve 61, the pump 63, the solenoid valve 64, the mixer 65, a solenoid valve 67, a regulator 71 and the solenoid valve 72, while the spraying unis 90 are travelling. Thus water containing about 6.5% by weight of silicate powder, grains of which are smaller than 20 $\mu$m in diameter, about 13% by weight of silicate powder, grains of which are smaller than 2 $\mu$m in diameter, about 9% by weight of etheric nonionic surface active agents, about 2.5% by weight of sulphonate surface active agents, and about 1.3% by weight oxidic amine are sprayed against the surface of the car under the pressure of 6 to 8 kg.cm$^2$.

During a third stage, the process is the same as that of the first stage except that the solenoid valve 61 is closed and the solenoid valve 62 is opened. Thus fresh water is applied to the surface of the car.

During a fourth stage, a mixture of fresh water and additives in a tank 81 is supplied to the nozzles 27 of the pipes 26 through the solenoid valve 62, the pump 63, a solenoid valve 79, a regulator 80, a mixer 83, and a solenoid valve 82, and air is also supplied to the nozzles 27 by a compressor 84 through a solenoid valve 86 and the pipes 28, while the spraying units 90 are travelling. Thus the water containing about 28% by weight of sulphonate type surface active agents and about 1.5% by weight of anticorrosive agents is sprayed as a foam to the surface of the car under a pressure of 1.5 to 2 kg/cm$^2$.

During a fifth stage, a mixture of fresh water and additives in a tank 68 is supplied to the pipes 24, 59 through the solenoid valve 62, the pump 63, the solenoid valve 64, the mixer 65, a solenoid valve 66, the regulator 71 and a regulator 73, while the spraying units 90 are travelling. Thus the water containing about 3.5% by weight of quaternary ammonium salt, about 1% by weight of tertiary amine, about 5% by weight of mineral oil and about 3% by weight of etheric nonionic surface active agents is sprayed surface of the car under a pressure of 1.5 to 2 kg/cm$^2$.

During a sixth stage, a mixture of fresh water and wax in a tank 77 is supplied to the nozzles 30 of the pipe 29 through the solenoid valve 62, the pump 63, a solenoid valve 74, a regulator 75, a mixer 78, and a solenoid valve 76, and air is also supplied to the nozzles 30 by the compressor 84 through a solenoid valve 85 and the pipes 31, while the spraying units 90 are travelling.

Thus the water containing about 7% by weight cation surface active agents, about 2% by weight of carnauba wax, about 3% by weight of paraffin wax, and about 11% by weight of ethylene glycol is sprayed on the surface of the car as a mist. Fine dust on the car is effectivley removed at the third stage of the washing process, because high speed movement of silicate powder removes dust from the surface of the car. So only the first to third stage processes are used to clean the car. The the fourth to sixth stage processes will maintain the cleanliness of the car for a long time.

After the above-mentioned washing processes are finished, the shutter 4 is opened and the hoods are driven backward in a reversed sequence from the one previously referred to.

When the inner hood 2 is moving backward, the inverted U-shaped pipes 58 blow air from a blower to the surface of the car, thereby removing drops of water from the car.

Although in the foregoing description the washing apparatus is provided with a movable outer hood 1, a stationary outer hood is also useful. In that case the inner hood will have to be provided with other air blowing pipes at both sides and top portions from the rear end thereof in order to remove water drops on the car completely. Drivers can easily get out of the car after parking in front of the apparatus of the type having a movable outer hood.

What is claimed is:

1. An apparatus for washing an automotive vehicle, said apparatus comprising:
   an outer hood having an open front end and a closed rear end;
   an inner hood within said outer hood and movable in and out of said outer hood through the open end thereof,
   said inner hood having an open front end and an open rear end, and a shutter for closing over the front end thereof,
   the outer hood and the inner hood with the shutter closed over the front end thereof defining a washing chamber in which the vehicle is washed;
   a pair of parallel guide rail means along which said inner hood moves in and out of said outer hood through the open end thereof; and
   washing liquid spraying means within said outer and said inner hood for spraying water on the vehicle in the washing chamber during a first cleaning stage, for spraying water containing a powder onto the vehicle during a second cleaning stage, and for spraying fresh water onto the vehicle during a third cleaning stage at a pressure that is high enough to cause the powder sprayed onto the vehicle during the second stage to move on the surface of the vehicle to remove any dust from the surface of the car.

2. The apparatus as claimed in claim 1,
   wherein said washing liquid spraying means comprises a plurality of pipes including a first pipe assembly attached to a rear end wall of said outer hood and having plurality of spraying nozzles for spraying a front portion of the vehicle within the washing chamber, a second pipe assembly comprising at least one pair of pipe units movable within the washing chamber along guide rails extending along upper portions of inner walls of said outer and said inner hoods,
   each said pipe unit having a vertical part, a horizontal part and a plurality of nozzles associated with said parts for spraying the sides and upper portion of the vehicle within the washing chamber.

* * * * *